(12) United States Patent

Cheng et al.

(10) Patent No.: US 12,632,135 B2

(45) Date of Patent: May 19, 2026

(54) DISPLAY DEVICE AND DISPLAY SYSTEM

(71) Applicant: E Ink Holdings Inc., Hsinchu (TW)

(72) Inventors: Te-Lung Cheng, Hsinchu (TW);
Yun-Nan Hsieh, Hsinchu (TW);
Chia-Ming Hsieh, Hsinchu (TW);
Chi-Mao Hung, Hsinchu (TW)

(73) Assignee: E Ink Holdings Inc., Hsinchu (TW)

( * ) Notice: Subject to any disclaimer, the term of this
patent is extended or adjusted under 35
U.S.C. 154(b) by 0 days.

(21) Appl. No.: 18/950,159

(22) Filed: Nov. 17, 2024

(65) Prior Publication Data

US 2025/0315124 A1 Oct. 9, 2025

(30) Foreign Application Priority Data

Apr. 8, 2024 (TW) .................................. 113113046

(51) Int. Cl.
*G06F 3/041* (2006.01)
*G09G 3/34* (2006.01)

(52) U.S. Cl.
CPC ......... *G06F 3/04162* (2019.05); *G09G 3/344*
(2013.01); *G06F 2203/04114* (2019.05); *G09G*
*2370/16* (2013.01); *G09G 2380/14* (2013.01)

(58) Field of Classification Search
CPC .................... G06F 3/04162; G06F 2203/04114
See application file for complete search history.

(56) References Cited

U.S. PATENT DOCUMENTS

| | | | |
|---|---|---|---|
| 9,696,826 B2 | 7/2017 | Holsen | |
| 9,851,854 B2 | 12/2017 | Slobodin et al. | |
| 2010/0220077 A1 | 9/2010 | Fukunaga et al. | |
| 2022/0317854 A1 | 10/2022 | Lee | |
| 2023/0067179 A1 | 3/2023 | Kim et al. | |
| 2024/0411407 A1* | 12/2024 | Gong | G06F 3/0383 |
| 2025/0224832 A1* | 7/2025 | Wang | G06F 3/04164 |

FOREIGN PATENT DOCUMENTS

| | | | | |
|---|---|---|---|---|
| CN | 115237278 A | * | 10/2022 | ......... G06F 3/04182 |
| TW | 202008139 A | | 2/2020 | |

OTHER PUBLICATIONS

The office action of corresponding TW application No. 113113046
issued on Mar. 14, 2025.

* cited by examiner

*Primary Examiner* — Priyank J Shah

(74) *Attorney, Agent, or Firm* — CKC & Partners Co.,
LLC

(57) ABSTRACT

This disclosure relates to a display device including a
display, a touch module, and a controlling circuit. The
controlling circuit determines whether a noise interference
phenomenon occurs on the touch module due to the display
showing multiple frames. If the noise interference phenom-
enon occurs, the controlling circuit sets that an uplink signal
or a downlink signal is generated by a first driving voltage.
If no noise interference phenomenon occurs, the uplink
signal or the downlink signal is generated by a second
driving voltage, where the first driving voltage is greater
than the second driving voltage.

12 Claims, 4 Drawing Sheets

DISPLAY DEVICE AND DISPLAY SYSTEM

CROSS-REFERENCE TO RELATED APPLICATION

This application claims priority to Taiwan Application Serial Number 113113046 filed Apr. 8, 2024, which is herein incorporated by reference in its entirety.

BACKGROUND

Field of Invention

This disclosure relates to a display device and an active pen used in conjunction with it, capable of dynamically adjusting a driving voltage on the active pen.

Description of Related Art

Electrophoretic Ink technology operates on the principle of electrophoresis, where charged particles move towards a positive or negative pole under the influence of an electric field. These tiny particles are encapsulated in microcapsules, each serving as a miniature display element or pixel. As the particles within these microcapsules move under the drive of the electric field, they form visible images on the surface of the display based on their direction of movement. The main structure of an electronic paper display device can be divided into two major parts: the Front Plane and the Back Plane. The Front Plane contains the electrophoretic ink, responsible for displaying images, while the Back Plane includes a Thin Film Transistor (TFT) array, used to control the electric field of each pixel, thereby enabling image display.

One of the main features of Electrophoretic Ink technology is its extremely low power consumption, as it only requires energy when a display frame changes. This makes electronic paper displays particularly well-suited for applications that require long-term display of static frames, such as e-book readers, electronic tags, and information displays that do not change frequently. Additionally, electronic paper displays offer a reading experience close to that of paper, are clearly visible in direct sunlight, and cause much less eye strain compared to traditional backlit LCD displays.

To enhance the interactivity of the electronic paper displays, many products incorporate touch functionality, allowing users to write or draw directly on the display with their fingers or a dedicated active pen. This mode of interaction expands the application range of electronic paper display technology from purely reading tools to multifunctional devices capable of note-taking, drawing, and other forms of creation. However, integrating touch technology with electronic paper display technology presents certain technical challenges, such as signal coupling on the Thin Film Transistor (TFT) with the touch module, which can lead to issues like broken lines during writing or drawing. To address these challenges, researchers must carefully design circuits and optimize driving algorithms to ensure smooth cooperation between the two technologies.

SUMMARY

It is to be understood that both the foregoing general description and the following detailed description are by examples, and are intended to provide further explanation of the invention as claimed.

Embodiments of the present disclosure provide a display device including a display, a touch module, and a controlling circuit electrically connected to the display and the touch module. The controlling circuit is configured to control the touch module to emit an uplink signal to an active pen which is configured to emit a downlink signal to the touch module. The controlling circuit is configured to determine whether a noise interference phenomenon occurs on the touch module due to the display showing multiple frames. If the noise interference phenomenon occurs, the controlling circuit is configured to set that the uplink signal or the downlink signal is generated by a first driving voltage. If the noise interference phenomenon does not occur, the controlling circuit is configured to set that the uplink signal or the downlink signal is generated by a second driving voltage, wherein the first driving voltage is greater than the second driving voltage.

In some embodiments, the controlling circuit is configured to determine whether a difference between two consecutive frames is greater than a threshold. If the difference is greater than the threshold, the controlling circuit is configured to determine that the noise interference phenomenon occurs.

In some embodiments, the controlling circuit is configured to perform a spatial-to-frequency transformation on at least a portion of each of the two consecutive frames to obtain two feature vectors, and determine if a difference between the two feature vectors is greater than the threshold.

In some embodiments, the touch module is configured to detect a touch position, and the portion of each of the two consecutive frames covers the touch position.

In some embodiments, the controlling circuit is configured to detect a noise component of sensing signals. If the noise component is greater than a noise threshold, the controlling circuit is configured to determine that the noise interference phenomenon occurs.

In some embodiments, the controlling circuit is configured to calculate a touch strength according to the sensing signals. If the touch strength minus a base value results in a strength difference greater than a touch threshold, the controlling circuit is configured to determine that the display device is touched. If the strength difference is less than or equal to the touch threshold, the controlling circuit is configured to take the strength difference as the noise component.

In some embodiments, when the noise interference phenomenon ends or a page-turning procedure begins, the controlling circuit is configured to set that the downlink signal or the uplink signal is generated by a voltage lower than the first driving voltage.

In some embodiments, the display device further includes a wireless communication module configured to communicatively connected to the active pen. The controlling circuit is configured to transmit a command to the active pen through the wireless communication module, such that the active pen emits the downlink signal by the first driving voltage.

From another aspect, embodiments of the disclosure provide a display system including an active pen and the display device.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
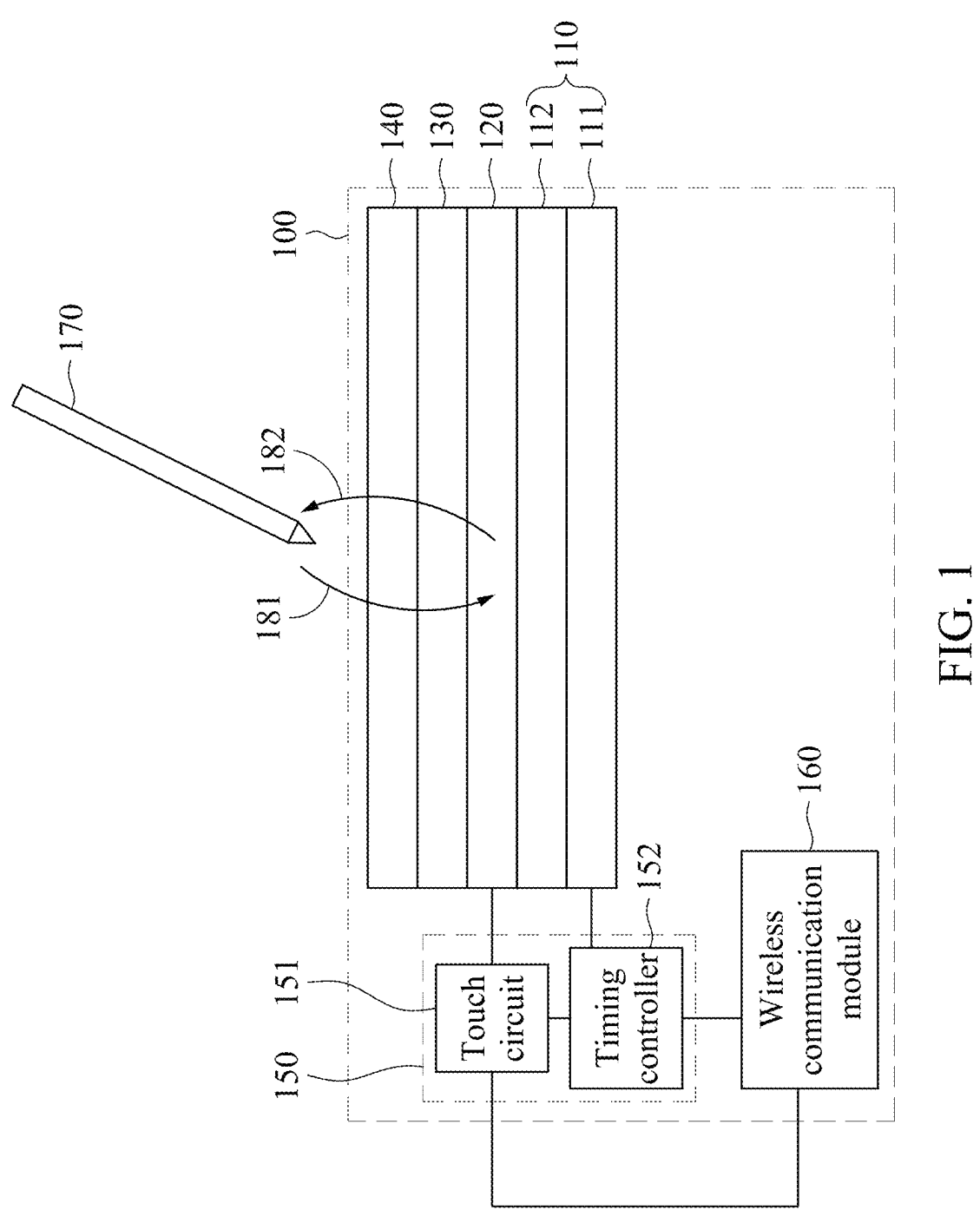
FIG. 1 illustrates a display system according to an embodiment.

Reference will now be made in detail to the present embodiments of the invention, examples of which are illustrated in the accompanying drawings. Wherever possible, the same reference numbers are used in the drawings and the description to refer to the same or like parts.

The using of "first", "second", "third", etc. in the specification should be understood for identifying units or data described by the same terminology, but are not referred to particular order or sequence.

FIG. 1 illustrates a display system according to an embodiment. Referring to FIG. 1, the display system includes a display device 100 and an active pen 170. The display device 100 comprises an electronic paper display 110, a touch module 120 (also known as a touch panel), a light guide plate 130, an optical film 140, a controlling circuit 150, and a wireless communication module 160. The controlling circuit 150 includes a touch circuit 151 and a timing controller 152, which are electrically connected to each other. The aforementioned electronic paper display 110 could also be other types of displays, such as LCD, plasma display, or organic light-emitting diode display, with the disclosure not being limited to the type of display used.

The electronic paper display 110 includes a control layer 111 and a Front Plane Laminate (FPL) 112. The timing controller 152 is electrically connected to the control layer 111, which contains a Thin Film Transistor (TFT) array, gate lines, data lines, electrodes, and other components. The FPL 112 acts as an electrophoretic display layer, containing multiple microcapsules. Each microcapsule holds electrophoretic particles suspended in a transparent liquid. These electrophoretic particles can be black and white to facilitate monochrome displays, or include red, green, and blue particles to support color displays. Through the control of the TFT, an appropriate electric field can be applied to the microcapsules, causing the electrophoretic particles to move according to the direction of the electric field. This movement allows the microcapsules to display specific colors, enabling the electronic paper display 110 to show frames, which can be either black and white or in color.

The touch module 120 includes multiple electrodes that can detect touch based on the principles of self-capacitive or mutual-capacitive sensing. Self-capacitive technology primarily measures changes in the capacitance of the electrodes themselves, while mutual-capacitive technology detects touch based on changes in capacitance between the electrodes. When the active pen 170 or a human finger touches a surface of the display device 100, the capacitance near the contact point changes. For self-capacitive technology, as the finger approaches the touch module, the conductivity of the human body attracts electric field lines, causing an increase in the effective capacitance of the electrodes. For mutual-capacitive technology, the contact of the finger or the active pen affects the capacitive coupling between the electrodes, thereby changing the capacitance values. Whether self-capacitive or mutual-capacitive, these electrodes are electrically connected to the touch circuit 151 via multiple sensing lines. By detecting these changes in capacitance, the touch circuit 151 can calculate a touch position and actions of the touch, such as tapping, double-tapping, swiping, etc.

The optical film 140, such as an anti-glare layer, primarily functions to reduce glare caused by reflections from external light sources, like sunlight or indoor lighting, on the surface of the display, thereby improving display effectiveness and enhancing viewer comfort. The anti-glare layer works by scattering reflected light, reducing the direct light that enters the viewer's eyes. This not only helps alleviate eye strain but also ensures that the screen remains clearly visible under various lighting conditions.

The wireless communication module 160 is electrically connected to the timing controller 152 and the touch circuit 151. In this embodiment, the wireless communication module 160 is a Bluetooth communication module, however, it could be Near Field Communication (NFC), Wi-Fi, or other communication modules in other embodiments. In some embodiments, the display device 100 may also incorporate a front light module (including multiple LEDs), but for simplicity, not all components of the display device 100 are illustrated in FIG. 1. The display device 100 in FIG. 1 is just an example, and this disclosure does not limit the arrangement of components within display device 100. In other embodiments, additional components could also be included, such as an ink barrier (IB) layer above the FPL 112. In other implementations, the positions of the touch module 120 and the light guide plate 130 could be interchanged. Between the various components in FIG. 1, optically clear acrylic adhesives (OCA) are used for bonding.

The active pen 170 is used for writing or drawing on the display device 100. For example, the active pen 170 includes a pressure sensor, Electromagnetic Resonance (EMR) components, a communication module, and a processor. The communication module in the active pen 170, for instance, is a Bluetooth communication module, enabling it to be communicatively connected to the wireless communication module 160. Additionally, the active pen 170 can send a downlink signal 181 to the touch module 120, and the controlling circuit 150 can control the touch module 120 to send an uplink signal 182 to the active pen 170. For example, the tip of the active pen 170 includes an electrode that can apply a time-varying signal to generate the downlink signal 181 based on a driving voltage. Since the electrode at the tip couples with the touch module 120, the downlink signal 181 is transmitted to the touch module 120. Similarly, the electrodes in the touch module 120 can transmit the uplink signal 182 to the active pen 170. Any method of signal generation can be used to produce the downlink signal 181 and uplink signal 182, as this disclosure is not limited to any specific techniques.

Figure 2:
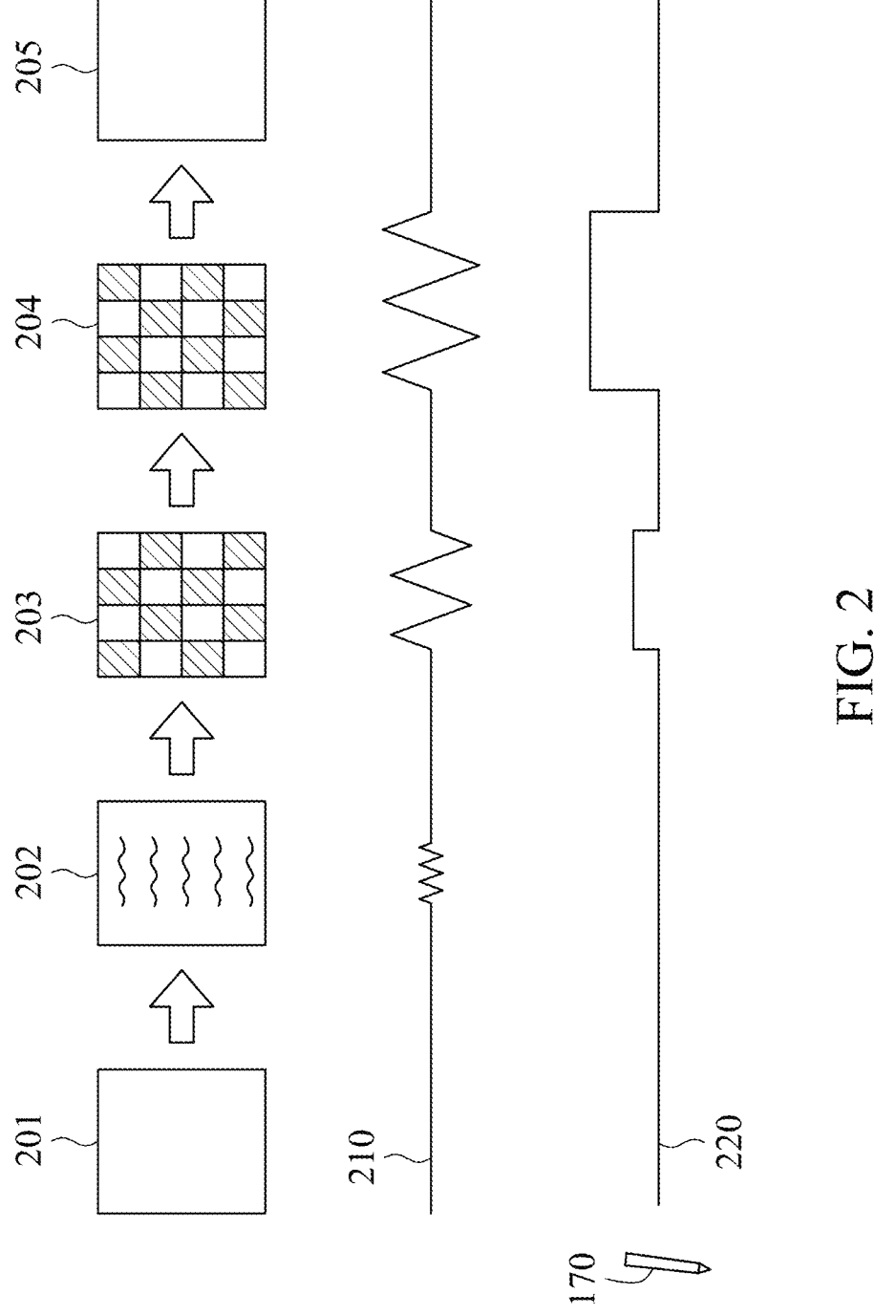
FIG. 2 illustrates the operation of the display device and the active pen according to an embodiment.

FIG. 2 illustrates the operation of the display device and the active pen according to an embodiment. Referring to FIGS. 1 and 2, in this example, the electronic paper display 110 sequentially displays frames 201-205. As content changes between the frames 201-205 become more significant, the electronic paper display 110 generates larger voltage variations, which are coupled to the touch module 120 as a noise 210. For example, the noise 210 generated when switching from the frame 201 to the frame 202 is relatively small, but it becomes more significant when switching from the frame 202 to the frame 203 or from the frame 203 to the frame 204. Excessive noise 210 may interfere with the touch module 120's ability to detect the uplink or downlink signals, leading to inaccurate detection of the touch position, and causing issues like breaks or jitter in the content displayed by the active pen 170 on the electronic paper display 110. Therefore, in this embodiment, when the noise 210 becomes too great, a driving voltage 220 on the active pen 170 is increased. This adjustment enhances the strength of the downlink signal, thereby improving the signal-to-noise ratio (SNR) and resolving detection issues. Alternatively, the driving voltage of the uplink signal can also be adjusted when the noise 210 is excessive to prevent the uplink signal from being affected by the noise. It is important to note that the content of the frames 201-205 is illustrative and does not imply a direct correlation between the frames and the noise. The mechanism for adjusting the driving voltage will be explained in detail with a flowchart in the following sections.

Figure 3:
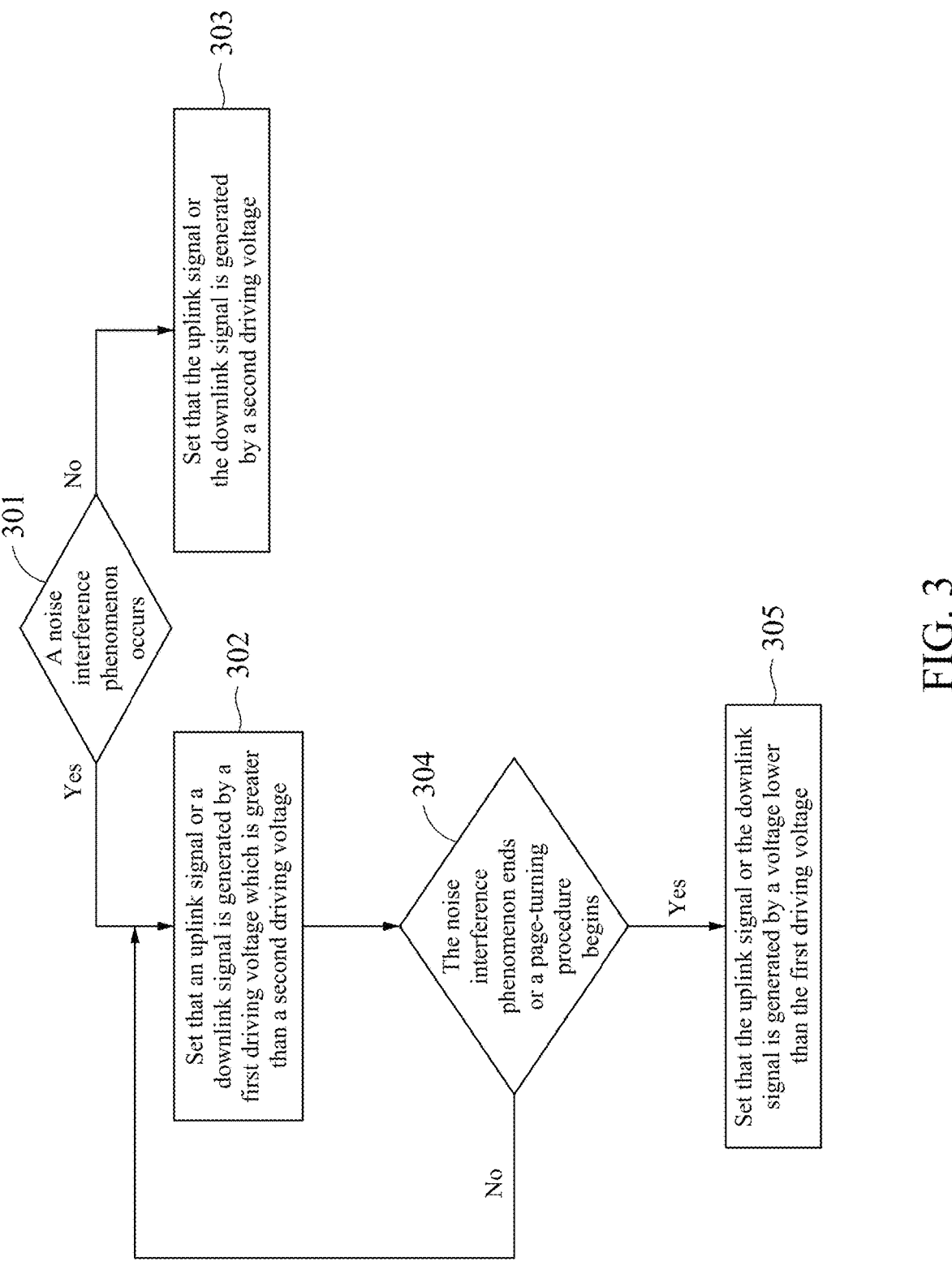
FIG. 3 illustrates a flowchart of a control method for the display system according to an embodiment.

Referring to FIG. 3, which illustrates a flowchart of a control method for the display system according to an embodiment. A step 301 involves the timing controller 152 determining whether a noise interference phenomenon has occurred on the touch module 120 due to the electronic paper display 110 showing multiple frames. There can be several methods to implement the step 301.

In some embodiments, it is possible to determine whether a difference between two consecutive frames is greater than a threshold. If this difference is greater than the threshold, the timing controller 152 determines that a noise interference phenomenon has occurred. For instance, pixel-by-pixel subtraction can be performed on the two consecutive frames, and then the differences are accumulated and compared with the threshold. Alternatively, spatial-to-frequency transformations, such as Fourier transforms, can be applied to each image. After transformation, frequency domain coefficients are obtained, and a feature vector can be extracted from these coefficients. In some embodiments, these frequency domain coefficients can be multiplied by a matrix to obtain a feature vector, where the matrix can be trained using machine learning techniques. Alternatively, coefficients at specific frequencies can be used as the feature vector. Each image can generate a feature vector, and subsequently, it can be determined whether the difference between these two feature vectors is greater than the threshold. This difference can be a sum of absolute differences, root mean square error, etc., and is not limited to these examples in this disclosure.

Figure 4:
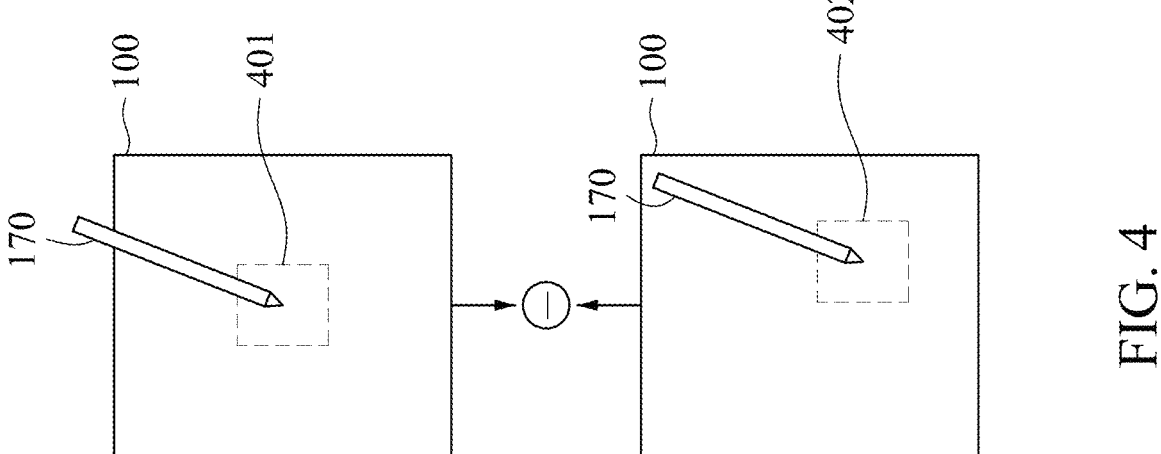
FIG. 4 illustrates scenarios where the active pen contacts the display device at two different time points.

In some embodiments, to reduce computational load, only a portion of the frame is subjected to the Fourier transform. For example, refer to FIG. 4, which illustrates scenarios where the active pen 170 contacts the display device 100 at two different time points; the upper image is from an earlier time point, and the lower image is from a later time point. After the touch module 120 detects a touch position of the active pen 170, a portion 401 of the frame is defined. This portion 401 covers the detected touch position, and only this portion 401 undergoes the Fourier transform to obtain a feature vector. Similarly, at the subsequent time point, another portion 402 of the frame is defined. This portion 402 covers the detected touch position, and only this portion 402 is transformed to obtain a feature vector. Subsequently, it can be determined whether the difference between these two feature vectors is greater than the threshold.

In some embodiments, it is also possible to determine occurrence of the noise interference phenomenon based on the sensing signals detected by the touch module 120. A noise component can be extracted from the sensing signals, and if this noise component is greater than a noise threshold, it indicates the occurrence of the noise interference phenomenon. Specifically, the sensing signal reflects changes in capacitance, which, after digitalization and processing, is represented as a touch strength. Assuming that the touch strength when there is no touch is x, also referred to as a base value; and the touch strength when touched is $x+\Delta x$. Here, the detected touch strength minus the base value results in a strength difference ($\Delta x$), and it is determined whether this strength difference is greater than a touch threshold. If so, the touch circuit 151 determines that the display device 100 has been touched; otherwise, if the strength difference $\Delta x$ is less than or equal to the touch threshold, the touch circuit 151 determines that the display device 100 has not been touched. However, even though the display device 100 is not touched, noises formed in the touch module 120 due to the frames displayed by the e-paper display 110 may still cause the calculated touch strength to be greater than the base value when not touched, for example, as $x+\Delta y$, where $\Delta y<\Delta x$. Therefore, when the touch circuit 151 subtracts the base value from the touch strength and gets the strength difference $\Delta y$, this strength difference is not greater than the touch threshold but is taken as a noise component in the sensing signal. The touch circuit 151 then determines whether this noise component is greater than a noise threshold. If the noise component is greater than the noise threshold and persists for several frames, then touch circuit 151 determines that a noise interference phenomenon has occurred. If the noise component is not greater than the noise threshold, or only exceeds it in one frame, then the touch circuit 151 determines that no noise interference phenomenon has occurred.

If the noise interference phenomenon occurs, in a step 302, the controlling circuit 150 sets that an uplink signal or a downlink signal is generated by a first driving voltage. For example, the controlling circuit 150 can control the touch module 120 to generate the uplink signal based on the first driving voltage. Additionally, the controlling circuit 150 can send a command to the active pen 170 via a wireless method (e.g., Bluetooth, WiFi) to set the driving voltage for the downlink signal. There are at least two ways to send this command. Refer to FIG. 1; the first method involves the system side (e.g., CPU, not shown), transmitting the command to the active pen 170 via the wireless communication module 160. The second method involves the touch circuit 151 transmitting the uplink signal, which includes the aforementioned command, to the active pen 170 via the touch module 120. Upon receiving the command, the active pen 170 will emit the downlink signal to the touch module 120 based on the first driving voltage.

If the noise interference phenomenon does not occur, in a step 303, the controlling circuit 150 sets that the uplink signal or the downlink signal is generated by a second driving voltage. In this embodiment, the second driving voltage is a default voltage, and therefore, the controlling circuit 150 does not need to send a command to the active pen 170 to change the driving voltage. Notably, the first driving voltage is higher than the second driving voltage. For example, the first driving voltage might be 38 volts, while the second driving voltage is 20 volts. However, the specific values of these driving voltages are not limited to those mentioned in this disclosure.

After the step 302, the process moves to a step 304, where it is determined whether the noise interference phenomenon ends or if a page-turning procedure begins. Specifically, a next frame is analyzed in the step 301 to ascertain whether the noise interference phenomenon occurs. If the next frame shows no noise interference phenomenon, the outcome of the step 304 is affirmative. On the other hand, the page-turning procedure refers to an update of the frame displayed by the e-paper display 110. If the update is complete (page turned) or partially complete (e.g., half the frame is updated), the outcome of step 304 is also affirmative. If the result of the step 304 is negative, the process returns to the step 302, continuing to generate the uplink or downlink signal with the first driving voltage. If the result of the step 304 is affirmative, then in a step 305, the uplink or downlink signal is set to be generated by a voltage lower than the first driving voltage. This voltage could be the second driving voltage or another voltage, and this disclosure does not limit the specific value. There are at least two methods to send a command to the active pen to reduce the driving voltage. The first method involves the timing controller 152 sending the command via the wireless communication module 160 to the active pen 170. The second method involves the touch circuit 151 sending an uplink signal through the touch module 120 to the active pen 170; this uplink signal includes the command.

As illustrated in FIG. 2, when the noise 210 increases, the driving voltage 220 on the active pen 170 is also increased, and conversely, when the noise 210 decreases, the driving voltage 220 on the active pen 170 is also reduced. Similarly, this process can be applied to the uplink signal; the driving voltage of the uplink signal increases with rising noise 210, and decreases as the noise diminishes. By employing this method, increasing the driving voltage when the display frames affect the touch module 120 can mitigate issues such as broken lines. Once the display frame no longer influences the touch module 120, reducing the driving voltage helps to decrease power consumption of the active pen 170. This adaptive adjustment ensures efficient operation of the touch system while managing power usage effectively.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display device comprising:
a display;
a touch module; and
a controlling circuit, electrically connected to the display and the touch module, and configured to control the touch module to emit an uplink signal to an active pen which is configured to emit a downlink signal to the touch module,
wherein the touch module is configured to detect a touch position, at least one portion of each of two consecutive frames of a plurality of frames shown by the display covers the touch position, and the controlling circuit is configured to determine whether a noise interference phenomenon occurs on the touch module due to the two consecutive frames in accordance with the at least one portion of each of the two consecutive frames,
wherein if the noise interference phenomenon occurs, the controlling circuit is configured to set that the uplink signal or the downlink signal is generated by a first driving voltage,
wherein if the noise interference phenomenon does not occur, the controlling circuit is configured to set that the uplink signal or the downlink signal is generated by a second driving voltage, wherein the first driving voltage is greater than the second driving voltage;

wherein the controlling circuit is configured to perform a spatial-to-frequency transformation on the at least one portion of each of the two consecutive frames to obtain two feature vectors, and determine if a difference between the two feature vectors is greater than a threshold.

2. The display device of claim 1, wherein the controlling circuit is configured to determine whether a difference between the at least one portion of each of two consecutive frames is greater than the threshold,
wherein if the difference between the at least one portion of each of two consecutive frames is greater than the threshold, the controlling circuit is configured to determine that the noise interference phenomenon occurs.

3. The display device of claim 1, wherein the controlling circuit is configured to detect a noise component of a plurality of sensing signals,
wherein if the noise component is greater than a noise threshold, the controlling circuit is configured to determine that the noise interference phenomenon occurs.

4. The display device of claim 3, wherein the controlling circuit is configured to calculate a touch strength according to the sensing signals,
wherein if the touch strength minus a base value results in a strength difference greater than a touch threshold, the controlling circuit is configured to determine that the display device is touched,
wherein if the strength difference is less than or equal to the touch threshold, the controlling circuit is configured to take the strength difference as the noise component.

5. The display device of claim 1, wherein when the noise interference phenomenon ends or a page-turning procedure begins, the controlling circuit is configured to set that the downlink signal or the uplink signal is generated by a voltage lower than the first driving voltage.

6. The display device of claim 1, further comprising a wireless communication module configured to communicatively connected to the active pen,
wherein the controlling circuit is configured to transmit a command to the active pen through the wireless communication module, such that the active pen emits the downlink signal by the first driving voltage.

7. A display system comprising:
an active pen; and
a display device comprising:
a display;
a touch module; and
a controlling circuit, electrically connected to the display and the touch module, and configured to control the touch module to emit an uplink signal to the active pen which is configured to emit a downlink signal to the touch module,
wherein the touch module is configured to detect a touch position, at least one portion of each of two consecutive frames of a plurality of frames shown by the display covers the touch position, and the controlling circuit is configured to determine whether a noise interference phenomenon occurs on the touch module due to the two consecutive frames in accordance with the at least one portion of each of the two consecutive frames,
wherein if the noise interference phenomenon occurs, the controlling circuit is configured to set that the uplink signal or the downlink signal is generated by a first driving voltage,
wherein if the noise interference phenomenon does not occur, the controlling circuit is configured to set that the uplink signal or the downlink signal is generated by a second driving voltage, wherein the first driving voltage is greater than the second driving voltage;

wherein the controlling circuit is configured to perform a spatial-to-frequency transformation on the at least one portion of each of the two consecutive frames to obtain two feature vectors, and determine if a difference between the two feature vectors is greater than a threshold.

8. The display system of claim 7, wherein the controlling circuit is configured to determine whether a difference between the at least one portion of each of two consecutive frames is greater than the threshold, wherein if the difference between the at least one portion of each of two consecutive frames is greater than the threshold, the controlling circuit is configured to determine that the noise interference phenomenon occurs.

9. The display system of claim 7, wherein the controlling circuit is configured to detect a noise component of a plurality of sensing signals, wherein if the noise component is greater than a noise threshold, the controlling circuit is configured to determine that the noise interference phenomenon occurs.

10. The display system of claim 9, wherein the controlling circuit is configured to calculate a touch strength according to the sensing signals, wherein if the touch strength minus a base value results in a strength difference greater than a touch threshold, the controlling circuit is configured to determine that the display device is touched, wherein if the strength difference is less than or equal to the touch threshold, the controlling circuit is configured to take the strength difference as the noise component.

11. The display system of claim 7, wherein when the noise interference phenomenon ends or a page-turning procedure begins, the controlling circuit is configured to set that the downlink signal or the uplink signal is generated by a voltage lower than the first driving voltage.

12. The display system of claim 7, wherein the display device further comprises a wireless communication module configured to communicatively connected to the active pen, wherein the controlling circuit is configured to transmit a command to the active pen through the wireless communication module, such that the active pen emits the downlink signal by the first driving voltage.

\* \* \* \* \*